(12) United States Patent  (10) Patent No.: US 8,382,992 B2
Mierswa  (45) Date of Patent: Feb. 26, 2013

(54) REDUCING WATERBORNE BACTERIA AND VIRUSES BY A CONTROLLED ELECTRIC FIELD

(75) Inventor: Sven Mierswa, San Carlos (MX)

(73) Assignee: Bio Concept, LLC, Phoenix, AZ (US)

( * ) Notice: Subject to any disclaimer, the term of this patent is extended or adjusted under 35 U.S.C. 154(b) by 387 days.

(21) Appl. No.: 12/668,869

(22) PCT Filed: Jul. 14, 2008

(86) PCT No.: PCT/US2008/069988
§ 371 (c)(1),
(2), (4) Date: Jan. 12, 2010

(87) PCT Pub. No.: WO2009/009795
PCT Pub. Date: Jan. 15, 2009

(65) Prior Publication Data
US 2010/0193359 A1   Aug. 5, 2010

(30) Foreign Application Priority Data

Jul. 12, 2007 (DE) .......................... 10 2007 032 916
Aug. 8, 2007 (EP) ..................................... 07015570

(51) Int. Cl.
*C02F 1/48* (2006.01)
(52) U.S. Cl. ...................... 210/748.01; 210/98; 210/143; 210/243; 210/167.01; 204/661; 204/663; 204/155; 204/670; 204/671; 205/688; 422/22; 422/186.04; 422/186.18; 422/186.16; 422/186.15; 361/245; 361/246
(58) Field of Classification Search ................... 204/155, 204/156, 157.15, 164, 554, 670, 671, 660, 204/661, 663, 194, 243; 210/748.01, 98, 210/143, 243, 167.01; 422/22, 105, 107, 422/108, 186, 186.04, 186.15, 186.16, 186.18; 205/688; 361/245, 246
See application file for complete search history.

(56) References Cited

U.S. PATENT DOCUMENTS

| 3,766,050 A | 10/1973 | Pados |
| 4,719,018 A * | 1/1988 | Przybylski ............... 210/748.19 |
| 5,377,721 A | 1/1995 | Kiyohiro |
| 5,419,816 A * | 5/1995 | Sampson et al. .............. 205/556 |
| 5,766,447 A | 6/1998 | Creijghton |
| 5,843,291 A * | 12/1998 | Eki et al. .................... 204/228.6 |
| 2004/0084381 A1 | 5/2004 | Korenev |
| 2006/0137996 A1 | 6/2006 | Mierswa |
| 2006/0196773 A1 | 9/2006 | Baosheng |
| 2007/0108056 A1 | 5/2007 | Nyberg |

* cited by examiner

*Primary Examiner* — Joseph Drodge
*Assistant Examiner* — Cameron J Allen
(74) *Attorney, Agent, or Firm* — Barbara Luther; The Luther Law Firm

(57) ABSTRACT

An apparatus for disinfecting a fluid has a fluid-containing structure; an inward-facing first electrically conductive cylindrical body contained within said fluid-containing structure; an outward-facing electrically conductive-second cylindrical body disposed within said first cylindrical body, in mutually facing parallel and coaxial relation thereto, and spaced apart therefrom to define a fluid-occupiable cavity; a power supply electrically coupled between said first cylindrical body and said second cylindrical body, said power supply producing therebetween an electric field, said field comprising a waveform approximating a series of alternating square wave pulses of opposite polarity, said pulses having a maximum absolute value of approximately 60 volts per centimeter, a complete cycle of said waveform, comprising a first pulse and a succeeding pulse of opposite polarity, recurring with a frequency of between about 2 kHz: and about 5 kHz and providing about 2 amps to about 4 amps.

10 Claims, 1 Drawing Sheet

REDUCING WATERBORNE BACTERIA AND VIRUSES BY A CONTROLLED ELECTRIC FIELD

TECHNICAL FIELD

The invention relates to a device and method of reducing bacteria and viruses in water by means of a controlled electric field.

BACKGROUND ART

In many locations, water supplies are chemically and biologically polluted. Biologically contaminated water causes public health problems for not only people but also for livestock. Metropolitan areas have been reported to have problems with pathogens, unpleasant odors and undesirable tastes. Rural areas, too, are dealing with increasing contamination. Water supplies must be treated for a wide variety of microorganisms, including but not limited to, coliform bacteria such as *E. coli, Klebsiella, Emerococcus faecalis, Campylobacter*, and *Salmonella*, protozoa such as *Giardia lamblia*, and viruses such as poliovirus and rotavirus.

Chemical means of purifying drinking and/or industrial water, such as chlorine and hydrogen peroxide, therefore continue to be used on a wide scale. It is known that this method in particular does not provide water that can be consumed immediately: where necessary, such water must first be boiled before consumption.

Chlorinated water, for example, can cause problems ranging from nausea to more serious digestive problems in people with allergic reactions, in convalescents weakened by illness or in small children. Normally, therefore, the only water that can be consumed without any concerns about health risks is water drawn from certificated mineral springs and sold in suitable packaging. In countries and regions of the world with a serious drinking water shortage, water is therefore becoming an increasingly expensive commodity.

The overfertilization of the soil in intensive farming and the penetration of such fertilisers into the groundwater further contribute to the scarcity of drinking and/or industrial water.

No devices and methods based on introducing an electric current into liquids, especially water, have yet been developed in accordance with the state of the art that enable water or other liquids contaminated by bacteria and/or viruses to be adequately purified.

A method and device is knows from DE 2455205 for electrically purifying and sterilising liquids. In addition to water supplies, for example, for soldiers in the field, for geologists in remote areas and for other fields of application, this invention also produces water tor medical/biological purposes. The invention has flowing current that is pulsating, with the duration of the current impulse and the voltage selected in such a way that electric discharges arise between the electrodes.

DE 100 14 289 A1 suggests a method based on electric currents and fields for carrying out disinfection to medical quality standards and for controlling biological processes in industrial production processes and products. In this invention a direct or alternating current, each of appropriate voltage, current and frequency, is [conducted] momentarily, at intervals or continuously via electrodes or by inductive or capacitive coupling into a substance and emitted. The said substance can be enriched with electrolytes and is in a conductive aggregate phase. The purpose of the invention is to rid the substance of all or some undesired spores, viruses, bacteria and other biologically active microorganisms as well as harmful parasites and microbes and their alternate hosts and/ or their forms of development, in such a way that these are killed, rendered incapable of propagation or development or paralysed for short or long periods.

An electrostatic water sterilising device is known from EP 0647 594 A2, consisting of a flanged cylinder housing and an elongated electrode positioned in the centre of the housing, with a generator for electrostatic lose voltage positioned outside the housing and a water inlet and a water outlet fitted next to two pieces of insulation at both ends of the housing. The entire inner surface of the whole of she housing is lined with a highly conductive material at a negative electric potential, so that it can act as a negative electrode. A low voltage electrostatic field is built up between the positive and negative electrode inside the housing after the generator is switched on.

A similar device is named in U.S. Pat. No. 3,766,050. This is a device for purifying liquids or solutions by means of electrical fields. The device consists of a vessel containing the liquid to be treated, whereby the wails of the vessel are made of dielectric material and electrodes positioned inside and outside in parallel arrangement and strength, which cars be variable, produce electric fields used to purify the liquids.

Because water cannot yet be purified adequately electrically and because of the need to avoid using chemical means, as mentioned above, it is imperative to guarantee the very basis of all life—namely the adequate supply of drinking and/or industrial water—in extreme situations as well, e.g., in the supply of water from well systems in areas of low rainfall, where the soil is bacterially contaminated.

DISCLOSURE OF INVENTION

The device and method operating under defined conditions enable delayed-acting electrically negatively and positively charged fields to be produced by physical means at a suitable frequency, voltage and current, enabling water that can be proved to be bacterially contaminated—especially drinking water—to be purified. Water treated in accordance with the invention does not require expensive chemical treatment to remove harmful pathogens often present in water and such water is quite safe for both animal and human consumption.

It is assumed that before water is treated in this way. It has already been cleaned by the usual mechanical means, that is to say, suspended solids or other solid crystalline particles present in the water have already been removed.

In accordance with the present invention, an exemplary embodiment of apparatus for disinfecting a fluid comprises a fluid-containing structure, an inward-facing first electrically conductive cylindrical body contained within the fluid-containing structure, and an outward-facing electrically conductive second cylindrical body disposed within the first cylindrical body, in mutually facing parallel and coaxial relation thereto, and spaced apart therefrom to define a fluid-occupiable cavity. A power supply is electrically coupled between the first cylindrical body and the second cylindrical body to produce an electric field in the fluid-occupiable space between them. The field varies over time, comprising a waveform approximating a series of alternating square wave pulses of opposite polarity. The pulses have a maximum absolute value of approximately 60 volts per centimeter. A complete cycle of the waveform, comprising a first pulse and a succeeding pulse of opposite polarity, recurs with a frequency of between about 2 kHz and about 5 kHz.

In another exemplary embodiment in accordance with the present invention, the waveform comprises a delay period, between a pulse and a succeeding, opposite pulse, during which delay period the electric field intensity has a value of approximately zero, the delay period being between zero and 20 microseconds.

In another exemplary embodiment in accordance with the present invention, the complete cycle recurs with a frequency of between about 3 kHz and about 4 kHz. In a most preferred embodiment, the frequency is about 3.5 kHz.

In another exemplary embodiment in accordance with the present invention, the first and second cylindrical bodies comprise 304 Stainless Steel.

In another exemplary embodiment in accordance with the present invention, the fluid-containing structure comprises a dielectric.

In another exemplary embodiment in accordance with the present invention, the fluid-containing structure comprises Schedule 40 PVC pipe.

In another exemplary embodiment in accordance with the present invention, the second cylindrical body has a length of approximately 16 cm. and an outer diameter of approximately 4 cm., the first cylindrical body has a length of 16 cm. and an inner diameter of approximately 7 cm., and the power supply applies a voltage having a maximum absolute value of approximately 90 volts, resulting in a current which rises for an absolute value of at least approximately 3 amperes for most of the cycle and, in a most preferred embodiment, about 3.3 amperes.

Also in accordance with the present invention, a method of disinfecting a fluid comprises steps of placing the fluid between an inward-facing first electrically conductive cylindrical body and an outward-facing electrically conductive second cylindrical body disposed within first cylindrical body, in mutually facing parallel and coaxial relation thereto, and spaced apart therefrom to define a fluid-occupiable cavity; and electrically energising the first cylindrical body and the second cylindrical body, producing therebetween an electric field. The field comprises a waveform approximating a series of alternating square wave pulses of opposite polarity. The pulses have a maximum absolute value of approximately 60 volts per centimeter. A complete cycle of the waveform, comprising a first pulse and a succeeding pulse of opposite polarity, recurs with a frequency of between about 2 kHz and about 5 kHz.

In another exemplary method, the waveform comprises a delay period, between a pulse and a succeeding, opposite pulse, during which delay period the electric field intensity has a value of approximately zero, the delay period being between zero and 20 microseconds.

In another exemplary method, the complete cycle recurs with a frequency of between about 3 kHz and about 4 kHz. In a most preferred embodiment, the frequency is about 3.5 kHz.

In another exemplary method, the first and second cylindrical bodies comprise 304 Stainless Steel.

In another exemplary method, the fluid-containing structure comprises a dielectric In another exemplary method, the fluid-containing structure comprises Schedule 40 PVC pipe.

In another exemplary method, the second cylindrical body has a length of approximately 16 cm. and an outer diameter of approximately 4 cm., the first cylindrical body has a length of 16 cm. and an inner diameter of approximately 7 cm., and the power supply applies a voltage having a maximum absolute value of approximately 90 volts, resulting in a current which rises to an absolute value of at least approximately 3 amperes for most of the cycle and, in a most preferred embodiment, approximately 3.3 amperes.

MODE(S) FOR CARRYING OUT THE INVENTION

Figure 1:
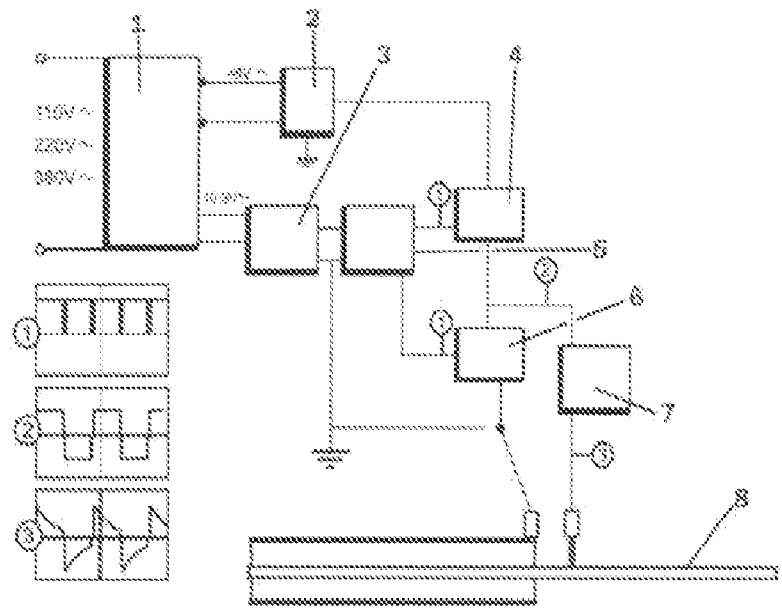
FIG. 1 is a block diagram of an exemplary electronic circuit configuration with attachments to a suitable device.
Figure 2:
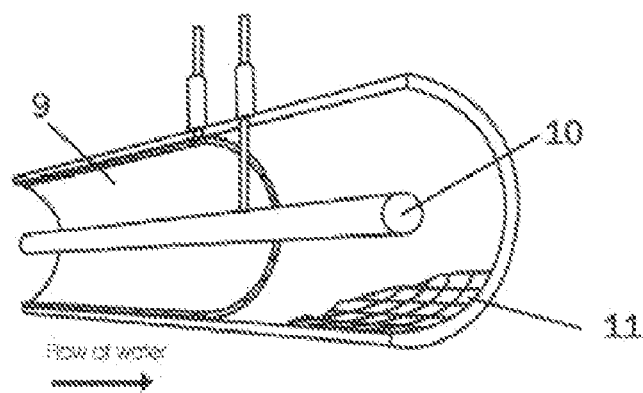
FIG. 2 is a cutaway perspective view of the device, showing half of the pipe containing the lining cathode and a centrally placed anode, as well as electrical connections and insulation.
Figure 3:
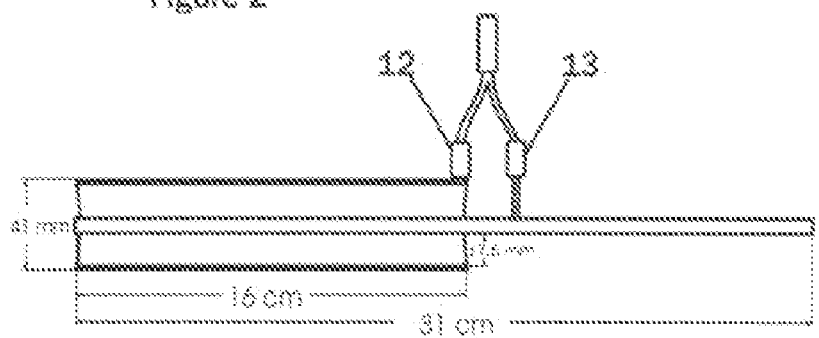
FIG. 3 is a cutaway side view of the device with exemplary details about design layout.

The object of the invention, therefore, is a device of simple construction that is combined with a circuit configuration composed of electronic elements. This circuit configuration—while maintaining discovered parameters—controls delayed negative and positive electrically charged fields in a defined frequency within a part of the inventive device, thereby destroying bacteria and/or viruses present in drinking and/or industrial water. The invention is intended to replace chemical substances otherwise normally used in the purification of drinking and/or industrial water, thereby achieving—apart from the known health benefits—a more favourable outcome in economic terms.

In contrast to prior microbicidal electric fields which utilized high intensity electrical fields on the order of 15 to 80 kilovolts/cm, the present invention utilizes low voltage (less than about 80 volts) to kill microbes in water. The inventor has discovered that the use of high voltage is not necessary in exterminating microbes in water. Moreover, the high voltage and particularly the use of electric discharges quickly destroys the anode and cathode. Other advantages of using low voltage are longer lasting parts such as the anode and cathode, lower input voltage requirement (use of lower voltage currents), and more economical operation.

The key to successful extermination of microbes at lower voltages is a controlled wave form and appropriate amperage. Preferably the profile of the wave is near enough to a square wave form so that there is a "break" in the flow of electricity to the cathode and anode. This "break" or pause contributes to less corrosion of the cathode and anode and decreases maintenance cost. The device also utilizes bipolar pulses, alternating anode and cathode with the break between pulses. This creates the balance that is necessary for the stability of the anode and cathode. A precise frequency range is varied between the anode and the cathode and appears to be critical to efficiency in drastically reducing the counts of a broad range of waterborne microbes.

Low voltage use allows for a broader range of applications of application and particularly in remote areas. Applications include residential, commercial, and industrial facilities, such as cooling towers, swimming pools and spas. No catalytic parts are needed, so there is no scheduled replacement scheduled, nor are there chemicals added to the water. This system is designed and includes materials to be essentially maintenance free. The system contains no moving parts to wear out. No additional pumps or motors for flow rate control are needed in most cases. Generally there is no requirement for holding tank(s) because water merely flows through the microbial death chamber at a normal flow rate. Of course, depending on the terrain and set up of the water supply, pumps and holding tanks may optionally be used with the system. There is no need of external generators to provide additional power over the standard (110, 220 or 380 volts) current. The system only requires an internal thermal fused transformer to reduce and control the supplied voltage.

The aim of the invention is solved according to the invention as set out below. The following supplementary notes with regard to the inventive method am necessary. The instant invention is specifically designed to use an applied AC voltage of 110 volts, 220 volts or 380 volts; and an AC voltage 1 and an AC voltage 2 are provided via a transformer or other suitable converter in an arrangement in accordance with the device. Both AC voltages are rectified, whereby the AC voltage 1, the working voltage, serves to trigger further effects and the AC voltage 2 serves to maintain an operating voltage of the printed circuit board with its electronic components.

The maintenance of their defined voltage parameters is provided by means of suitable components positioned downstream of the transformer. A microprocessor centrally connected to the afore-mentioned printed circuit board produces, by virtue of the applied operating voltage, two delayed control signals for two transistors in active contact with the microprocessor. These delayed control signals are applied to the transistors at intervals of a few microseconds at a constant selected frequency of up to about 5000 Hz. A transistor I subsequently supplies a positive electric charge and a transistor II a negative charge, with voltage peaks—in terms of the zero crossing—of about 66 volts. In addition, the outputs of transistors I and II are connected on the one hand via an active connection with a cathode of the inventive device and via a capacitor combination of the circuit configuration on the other hand, so that the capacitor assembly at a voltage of about 90 volts produces an electric field with alternating electric charges, whereby a current flow of slightly over about 3 amp is produced, most preferably about 3.3 amp. The output of the capacitor assembly is connected with the anode of the inventive device, with said anode, which is in the form of a metal rod or metal tube, being located in the centre of the insulated cathode—a metal tube. Suitable fasteners are employed to hold the anode in a central position at both its ends, which extend over the ends of the cathode. The cathode takes up about a third of the available space within the tubular device. The inventive device is fitted with an external casing, made of non-metallic material, preferably plastic, and more preferably schedule 40 PVC. The flow direction of the water contaminated with bacteria and/or viruses is from the side of the device facing away from the cathode.

The invention will now be explained in greater detail by means of a suitable execution example. In the execution example the individual figures use the following reference numerals:

| | |
|---|---|
| 1- | Transformer |
| 2- | Cross-bridge |
| 3- | Voltage regulator |
| 4- | Transistor I |
| 5- | Microprocessor |
| 6- | Transistor II |
| 7- | Capacitor assembly |
| 8- | Device |
| 9- | Cathode |
| 10- | Anode |
| 11- | Insulation |
| 12- | Transistor connection |
| 13- | Capacitor connection |

A transformer providing an AC voltage of 48 volts and 10 volts is connected across a normal voltage network maintaining 110 volts, 220 volts or 380 volts. These afore-mentioned values are changed to DC voltage, with the adjusted 48 volts being used as a working voltage and the 10 volts V—further transformed into 5 volts—used as an operating voltage for the printed circuit board of the circuit configuration.

A microprocessor 5 centrally integrated in the circuit configuration controls two transistors I, II (4 and 6) downstream of said microprocessor 5 at a frequency of about 2000-5000 preferably about 3000 to about 4000 Hz, most preferably about 3500 Hz, and with a delay of leas than 20 microseconds in such a way that said transistors each produce a positive and negative charge in the water flowing through the device 8 in continuously alternating cycles, especially in the section of the tubular integrated cathode 9, in the centre of which an anode 10 is positioned. The voltage levels at the outputs of the transistors I, II (4 and 6) are to be, for example, 66.25 volts and at the output of the capacitor assembly 92.5 volts. Preferably the capacitor is MKT. The flowing electric current is preferably above about 3 amps, most preferably about 3.3 amp.

The device 8 has been dimensioned by way of example in such a way that, while maintaining the aforementioned electrical parameters, the width of the tubular cathode in the device is 16 cm, the overall diameter of the anode plus its insulation is 4 cm, the overall, length of the device is here 25 cm and the external gap between anode 10 and cathode 9 is here 15 cm. The anode and cathode can be fabricated from a variety of materials, but steel is preferred. Preferably the steel is 304 stainless for longer use. Preferably the anode is at least as long or longer than the cathode. The dimensions also can be varied for higher contaminated water flow rates to extend the contact area and time.

EXAMPLE 1

The above device with 3 amps was tested according to EPA protocols for microbiological purification of water. The independent test laboratory was provided with samples of pre-treated water seeded with the microbe and with samples of the treated water and provided a report summarizing the total counts pre- and post-treatment and the treatment efficiency. For most organisms, the laboratory used the colony forming unit (CPU) method to estimate concentration of bacteria at the beginning and end of the study. The following table lists the organisms, the pre-treatment counts and the treatment efficiency for each test.

| Microbe | Starting CFU/ml | Percent Reduction |
|---|---|---|
| E. coli | $2.8 \times 10^4$ | 99.88 |
| Salmonella | $3 \times 10^6$ | 98.70 |
| Klebsiella | $3 \times 10^6$ | 99.20 |
| Campylobacter | $3.5 \times 10^6$ | 90.30 |
| E. faecalis | $2.8 \times 10^6$ | 98.00 |

There also was a less of the *Giardia lamblia* protozoan, utilizing the exclusion criteria with blue trypan colorant to estimate the viable cysts and not viable cysts to determine the effect of the device on this human intestinal parasite. In the case of *Giardia lamblia*, there was a reduction of 97.2% of viable cysts.

It is possible to modify the design of the device 8 using differently set voltage and current levels arrived at during experiments. This applies particularly if smaller or larger amounts of purified water are required.

EXAMPLE 2

An apparatus in accordance with the present invention but providing 3.3 amps was tested at the University of Sonora, Mexico, using a United States Environmental Protection Agency protocol for determining effectiveness at reducing viability of waterborne microorganisms. The results were as follows:

| Microbe | Result (% no longer viable) |
|---|---|
| *Salmonella* SP | 99.9 |
| *Klebsiella* SP | 99.9 |
| *Campylobacter* SP | 99.7 |
| *Enterococcus faecalis* | 99.9 |
| *Giardia* | 99.4 |

Laboratory tests were run with water samples containing known concentrations of poliovirus and rotavirus. The kill rate was about 90%.

Although specific embodiments have been illustrated and described herein, those of ordinary skill in the art will appreciate that any arrangement calculated to achieve same purposes can be substituted for the specific embodiments shown. This disclosure is intended to cover any and all adaptations or variations of various embodiments of the invention, it is to be understood that the above description has been made in an illustrative fashion, and not a restrictive one. Combinations of the above embodiments, and other embodiments not specifically described herein will be apparent to those of skill in die art upon reviewing the above description. The scope of various embodiments of the invention includes nay other applications in which the above structures and methods are used. Therefore, the scope of various embodiments of the invention should be determined with reference to the appended claims, along with the full range of equivalents to which such claims are entitled.

In the foregoing description, if various features are grouped together in a single embodiment for the purpose of streamlining the disclosure, this method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims, and such other claims as may later be added, are hereby incorporated into the description of the embodiments of the invention, with each claim standing on its own as a separate preferred embodiment.

The invention claimed is:

1. An apparatus for disinfecting a fluid, comprising:

a fluid-containing structure;

an inward-facing first electrically conductive cylindrical body contained within said fluid-containing structure;

an outward-facing electrically conductive second cylindrical body disposed within said first cylindrical body, in mutually facing parallel and coaxial relation thereto, and spaced apart therefrom to define a fluid containing cavity;

a power supply electrically coupled through a converter to reduce and control incoming voltage of the power supply;

the converter electrically coupled with a microprocessor that produces two delayed control signals in two connected transistors at a frequency of between 2 kHz and 5 kHz; and one transistor also electrically coupled to the first cylindrical body and the other transistor further connected to a capacitor which in turn is electrically coupled to the second cylindrical body;

thereby producing in the fluid-containing cavity a first pulse and a succeeding pulse of opposite polarity, recurring with a frequency of between 2 kHz and 5 kHz, said pulses having a maximum value of approximately 60 volts per centimeter, said field comprising a waveform approximating a series of alternating square wave pulses of opposite polarity.

2. The apparatus of claim 1, wherein said waveform comprises a delay period, between a pulse and a succeeding, opposite pulse, during which delay period the electric field intensity has a value of approximately zero, said delay period being between zero and 20 microseconds.

3. The apparatus of claim 1, wherein said first pulse and said succeeding pulse recur with a frequency of between 3 kHz and 4 kHz.

4. The apparatus of claim 1, wherein said first and second cylindrical bodies comprise 304 Stainless Steel.

5. The apparatus of claim 1, wherein said fluid-containing structure comprises a dielectric.

6. The apparatus of claim 1, further comprising an external casing that comprises Schedule 40 PVC pipe.

7. The apparatus of claim 1, wherein said second cylindrical body has a length of approximately 16 cm, and an outer diameter of approximately 4 cm., said first cylindrical body has a length of about 16 cm, and an inner diameter of approximately 7 cm., and said power supply applies a voltage having a maximum absolute value of approximately 90 volts, resulting in a current of minimum average absolute value approximately 3 amperes.

8. The apparatus of claim 1, wherein said first pulse and said succeeding pulse recur with a frequency of about 3.5 kHz.

9. The apparatus of claim 7, wherein said minimum average absolute value is about 3.3 amperes.

10. The apparatus of claim 9, wherein said first pulse and said succeeding pulse recurs with a frequency of approximately 3.5 kHz.

* * * * *